Patented Apr. 17, 1928.

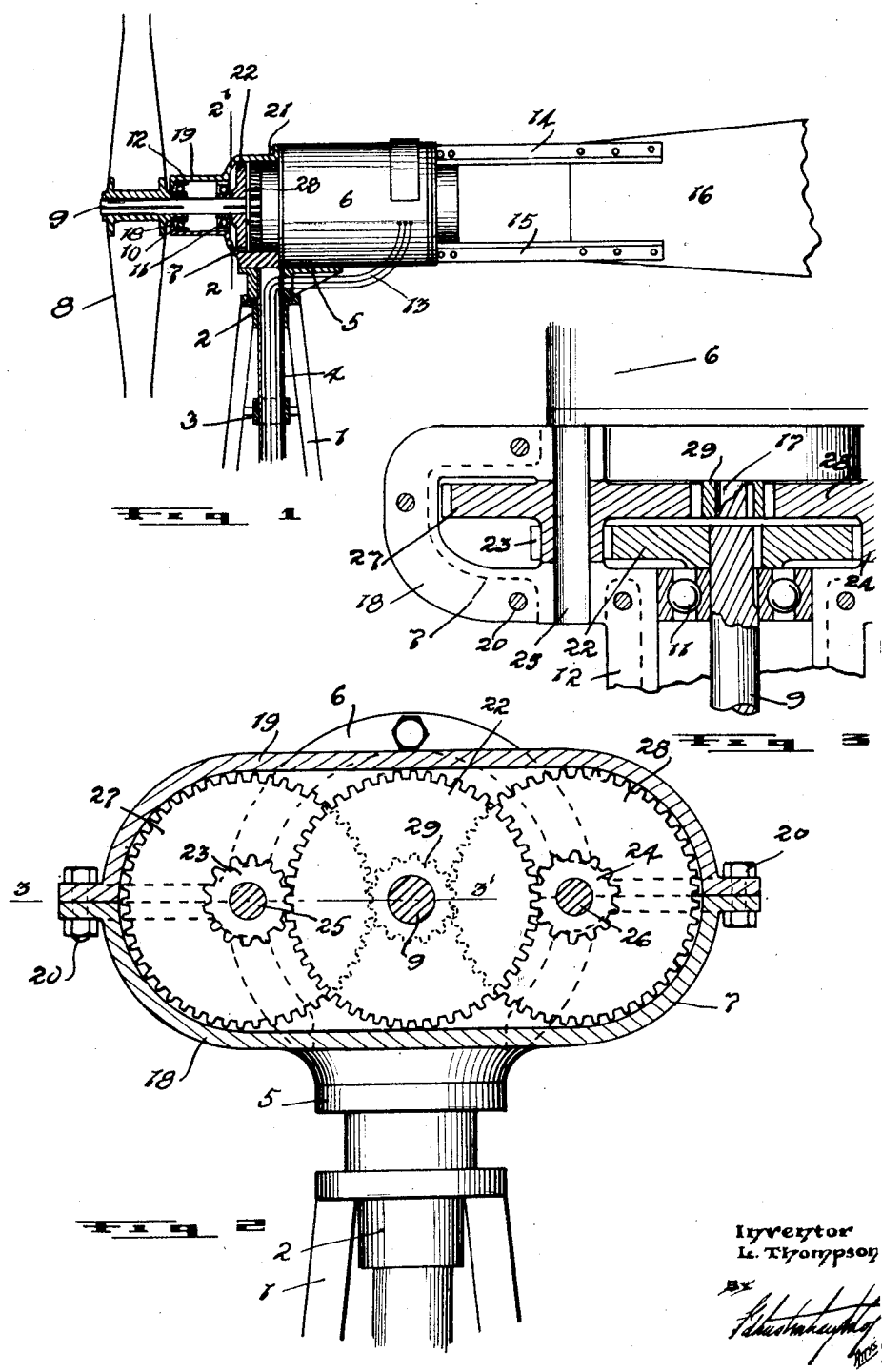

1,666,361

UNITED STATES PATENT OFFICE.

LAURENCE THOMPSON, OF WARREN, MANITOBA, CANADA.

WINDMILL.

Application filed March 28, 1927. Serial No. 179,119.

The invention relates to improvements in windmills and an object of the invention is to provide a wind driven electric generator for charging batteries and other such uses in which the intermittent operation of the generator is permissible and in carrying out the invention I have designed and improved the speed increasing gear between the wind wheel and the generator which is of such high efficiency as to make a wind wheel driven motor a practical device.

With the above object in view, the invention consists essentially in the arrangement and construction of parts hereinafter more particularly described, reference being had to the accompanying drawing, in which:

Fig. 1 is a view showing the device in side elevation and partly in section and with the wind wheel and directing tail broken away.

Fig. 2 is an enlarged detailed vertical sectional view at 2—2′ Figure 1.

Fig. 3 is a horizontal sectional view at 3—3′ Figure 2.

In the drawing like characters of reference indicate corresponding parts in the several figures.

As is customary practice, the device as a whole is rotatably mounted on a vertical axis at the upper end of the customary mast 1. The mast is provided at the upper end with a thrust bearing 2 and radial bearings 3 which receive rotatably a tubular shaft 4. The upper end of the shaft carries a support or base 5 for the generator 6 and the housing 7 of the wind motor. The wind wheel 8 is suitably secured to the shaft 9 and the shaft is rotatably carried in bearings 10 and 11 mounted in the tubular extension 12 of the housing. The invention does not relate in any way to the design of the generator or the wind wheel and accordingly the structures of such parts are not described or shown.

The electrical conductors 13 pass from the generator downwardly through the hollow shaft 4 and terminate at suitable slip rings (not shown) from which the current is led to the battery. The generator is provided at its rear end with bars 14 and 15 which support the customary directing tail 16. The generator is fastened in any suitable manner to the base 5 and the housing 7 is also mounted on the base directly at the front of the generator and has the shaft 9, the rear end of which extends into the housing, axially aligned with the generator shaft 17. The housing is somewhat elliptical in shape as best shown in Figure 2 and is horizontally split, the lower half or section 18 thereof being fastened to the base 5 and the upper section 19 thereof being detachably secured by bolts 20 to the lower section and by screws 21 to the front end of the motor.

To the rear end of the shaft 9, I secure a gear wheel 22 and this wheel meshes continuously with two pinions 23 and 24 rotatably mounted on counter shafts 25 and 26, the latter shafts crossing the housing and having their ends rotatably mounted in the opposing walls thereof. The shafts 9 and 17 and the counter shafts 25 and 26 are all contained in the same horizontal plane and the counter shafts are parallel to the aligned shafts 9 and 17. The counter shafts carry also gear wheels 27 and 28 which are herein shown as integrally formed with the pinions. The said latter gear wheels are the same size as the gear wheel 22 and pass to the rear thereof and are both meshed with a pinion 29 secured to the forward end of the generator shaft, the pinion 29 being the same size as 23 and 24. Grease or oil can be placed in the housing as is common practice, such materially reducing the friction between the intermeshed gears and pinions.

When this windmill is operating in the wind, the wind wheel turns the shaft 9 in the usual manner and such shaft rotates the generator shaft at a comparatively high speed, such being brought about by the ratio of the intermeshed gears and pinions. I wish it to be particularly observed that the generator shaft and the wind wheel shaft are axially aligned and further that the arrangement of the gear wheels and pinions is such that the system is balanced. Further there is no possibility of the windmill swinging sideways under the wind pressure as the thrust of the wheel in the wind is directly radial to the tower.

What I claim as my invention:—

In windmill construction, the combination with a horizontally disposed rotatable base plate, of an electrical generator secured to the rear portion of the base plate, a horizontally divided housing in advance of the generator, said housing having the under section thereof secured to the base plate, and the upper section thereof detachably fastened to the under section and being provided at the end remote from the generator with a bearing extension, a wind wheel shaft rotatably mounted in said extension and aligned with the generator shaft and entering the housing, a gear wheel secured to the inner end of the wind wheel shaft, a pinion secured to the forward end of the generator shaft and contained within the housing, counter shafts crossing the housing and positioned parallel to the aligned shafts, and disposed equidistant at opposite sides thereof and having their ends removably mounted between the upper and lower sections of the housing, similar pinions secured to the counter shafts and meshing with the gear wheel of the windmill shaft and similar gear wheels secured to the counter shafts and meshing with the pinion of the generator shaft.

Signed at Winnipeg, this 11th day of March, 1927.

LAURENCE THOMPSON.